United States Patent

Takahashi

[11] Patent Number: 5,832,251
[45] Date of Patent: Nov. 3, 1998

[54] EMULATION DEVICE

[75] Inventor: Hiromichi Takahashi, Tokyo, Japan

[73] Assignee: NEC Corporation, Tokyo, Japan

[21] Appl. No.: 655,187

[22] Filed: May 30, 1996

[30] Foreign Application Priority Data

Jun. 2, 1995 [JP] Japan .................................. 7-159850

[51] Int. Cl.$^6$ .................................................. G06F 7/48
[52] U.S. Cl. ......................................................... 395/500
[58] Field of Search ........................................... 395/500

[56] References Cited

U.S. PATENT DOCUMENTS 4,901,259 2/1990 Watkins .................................. 364/578
5,546,562 8/1996 Patel ....................................... 395/500

FOREIGN PATENT DOCUMENTS 60-186934 9/1985 Japan .
61-84737 4/1986 Japan .

OTHER PUBLICATIONS

User's Manual 1PD 7484026 series 16/8 bit Single Chip Microcomputer (provisional edition), pp. 508–514.

*Primary Examiner*—Vincent N. Trans
*Attorney, Agent, or Firm*—Whitham, Curtis & Whitham

[57] ABSTRACT

An emulation device comprising an evaluation microcomputer 100 incorporating a rewritable micro RAM 204, an emulation memory 103 substituting a memory means for a user's program, a supervisor CPU 101 for processing a privileged mode and a control section 102 for controlling the operation of each of the sections, in which the emulation memory 103 provides a microprogram storage region 103A for temporarily storing the microprogram to be transferred to the micro RAM in the evaluation microcomputer 100.

7 Claims, 6 Drawing Sheets

EMULATION DEVICE

BACKGROUND OF THE INVENTION

1. Field of the Invention

The present invention concerns an emulation device using a microcomputer for conducting operation control by a stored microprogram and, more in particular, it relates to an emulation device using an evaluation microcomputer for the development of application apparatus.

2. Description of the Related Art

As microcomputers have become more varied or versatile at present, microcomputers of a microprogram system that control operation by microprogram stored in the microcomputers themselves have become predominant.

The microcomputer of such microprogram system can perform different kinds of processes using one identical hardware unit by incorporating various microprogram in the microcomputer per se, which has a merit capable of extending the range of application use.

In the above-mentioned microcomputer, microprogram are stored in ROM referred to as a micro ROM in the microcomputer. Accordingly, it is necessary also for an evaluation microcomputer used for the development of application apparatus utilizing the microcomputer (hereinafter referred as an evaluation chip) to have the same constitution as that of usual microcomputers. That is, the microprogram for the operation control of the evaluation chip has to be stored in ROM in the evaluation chip.

However, for the emulation device using an evaluation chip of such a system as having a microprogram stored in an internal ROM, extension of functions is troublesome even if it is a simple an extension such as extension of an instruction set upon development of the evaluation chip. For instance, as described in "User's Manual lPD 7484026 series 16/8 bit Single Chip Microcomputer (provisional edition)" pp 508–541, when a new function of a micro service is added to already provided micro service functions, a corresponding microprogram has to be added to ROM. However, it is not possible to additionally write the new program to an already manufactured ROM. Accordingly, an evaluation chip has to be prepared for every partial modification or addition of a microprogram, which is cost- and time-consuming.

In order to overcome the drawback mentioned above, alteration of the microprogram has been coped with by incorporating not a ROM but a RAM in an evaluation chip and writing a microprogram for the operation control from the outside of the emulation device to the RAM upon starting the emulation device. In this case, a temporary storage memory is provided for temporarily storing a microprogram for operation control inputted from the outside to the emulation device. The microprogram inputted from the outside upon starting the emulation device is once written into the temporary storage memory and, further, the microprogram is written from the temporary storage memory into the RAM in the evaluation chip. FIG. 5 shows a block diagram of such an emulation device.

In the figure, only the constitution necessary for writing the microprogram from the outside of the emulation device into the RAM in the evaluation chip is shown, and other peripheral circuits are not illustrated. The evaluation chip, the supervisor CPU, the control section, the emulation memory and temporary storage memory are formed as one chip semiconductor devices respectively.

An external host machine (not illustrated) is connected to a supervisor CPU 101 and communication between the evaluation device and the outside is controlled by the supervisor CPU. This operation mode is referred as a privileged mode or a supervisor mode.

As shown in the figure, the emulation device of the prior art comprises an evaluation chip 100, a supervisor CPU 101 and a control section 501 for controlling the emulation device by conducting communication between the emulation device and the host machine outside of the emulation device and communication with the evaluation chip 100 in the emulation device, an emulation memory 503 substituting a user's program memory region or a memory in the microcomputer, and a temporary storage memory 502 for temporarily storing the microprogram inputted from the external host machine.

The evaluation chip 100 accesses the emulation memory 503 and the temporary storage memory 502 via an address bus EMA 105 and a data bus EMD 105. EMRD 111 and EMWR 113 are a read signal and write signal, respectively, to the emulation memory 103. MDLC 112 is a microprogram load strobe signal for loading a microprogram stored in the temporary storage memory into the internal RAM 100. SVMOD 110 is a signal for switching transfer of the control for the emulation device either to the evaluation chip or to the supervisor CPU 101.

The supervisor CPU 101 communicates with the outside of the emulation device and accesses via an address bus SA 106 and a data bus SD 107 to the emulation memory or the temporary storage memory. SVRD 116 and SVWR 117 are a read signal and a write signal, respectively, to the emulation memory 103. SVWR is used also as a write strobe signal upon writing the microprogram from the outside to the temporary storage memory.

FIG. 6 is a block diagram showing the constitution of the control section 501. The control section 501 comprises an address selector 300, a data selector 301, an address decoder 601, NOR gates 602 and 304, an OR gate 305 and a NAND gate 306.

The control section 501 is adapted to receive the signals described above outputted from the evaluation chip and the supervisor CPU, and connect the address bus 108 and the data bus 109 to EMA and EMD or to SA and SD, respectively, as well as output a chip select signal 118, a memory read 119 as a read strobe signal, a memory write 120 as a write strobe signal to the emulation memory and a chip select signal 503 to the temporary storage memory.

Alteration of the microprogram has been done by loading the microprogram from the temporary storage memory into RAM provided in the evaluation chip upon starting the emulation device. The above-mentioned technique is disclosed, for example, in Japanese Patent Laid-Open Sho 60-186934 and Sho 61-84737.

As has been described above, in the emulation device of the prior art adapted to input the microprogram from the outside, a memory for temporarily storing the microprogram has to be provided separately in addition to the emulation memory as the user's program area and the memory area required for the operation of the evaluation chip. Accordingly, it is necessary to extend the address bus and the data bus not only to the emulation memory but also to the memory for the temporary storage of the microprogram. Therefore, the pattern area is increased by so much as the extension of the buses to result in a drawback of enlarging the scale of the emulation device.

Particularly, interfaces have been increased more and more for microprogram addresses and address data buses by the improvement for functions and the increase of the operation speed of microcomputers at present, so that the pattern area has also tended to be increased by the extension of the buses correspondingly. On the other hand, there has been an increasing demand for the reduction of the size of the apparatus and the reduction of the cost.

In addition, in the high speed operation, it is not negligible for the effect of noises caused by the increase of the area for bus wiring. In order to minimize the effect of the noises, it is required to consider the pattern of substrates, which brings about another problem of increasing the number of design steps.

Accordingly, in view of the demands for the reduction of the substrate area accompanying the reduction of the device and the decrease of the number of design steps corresponding to the reduction of the life cycles of the products, it is preferred to utilize, as much as possible, accumulated design knowledge for the emulation device using micro ROM type evaluation chip (only the emulation memory is necessary for the memory). That is, it is more economical to add circuits with least modification of existent circuit portions since the increase for the number of evaluation steps can be suppressed.

SUMMARY OF THE INVENTION

An object of the present invention is to provide an emulation device using an evaluation chip including a micro RAM for storing microprogram and means for temporarily storing the microprogram while avoiding increase of buses and increase of the pattern area for a substrate.

The foregoing object of the present invention can be attained in accordance with the present invention by an emulation device comprising an evaluation microcomputer having a rewritable microprogram storage means, a substitution means for substituting a memory means of a user's program, a microcomputer for conducting processing of a privileged mode and a control means for controlling the operation for each of the sections described above, in which the substitution means provides a region for temporarily storing a microprogram for operation control stored in the evaluation microcomputer.

In accordance with the present invention, in the emulation device using the evaluation microcomputer having the rewritable microprogram storage means, the substitution means for substituting the memory means of the user's program provides a region for temporarily storing the microprogram for operation control to be stored in the evaluation microcomputer, whereby the microprogram written into the evaluation microcomputer can be stored with no physical addition of constitution.

The above and other object, features and advantages of the present invention will be apparent from the following description of preferred embodiment of the invention with reference to the accompanying drawings.

DESCRIPTION OF THE PREFERRED EMBODIMENT

The present invention is explained with reference to the drawings.

Figure 1:
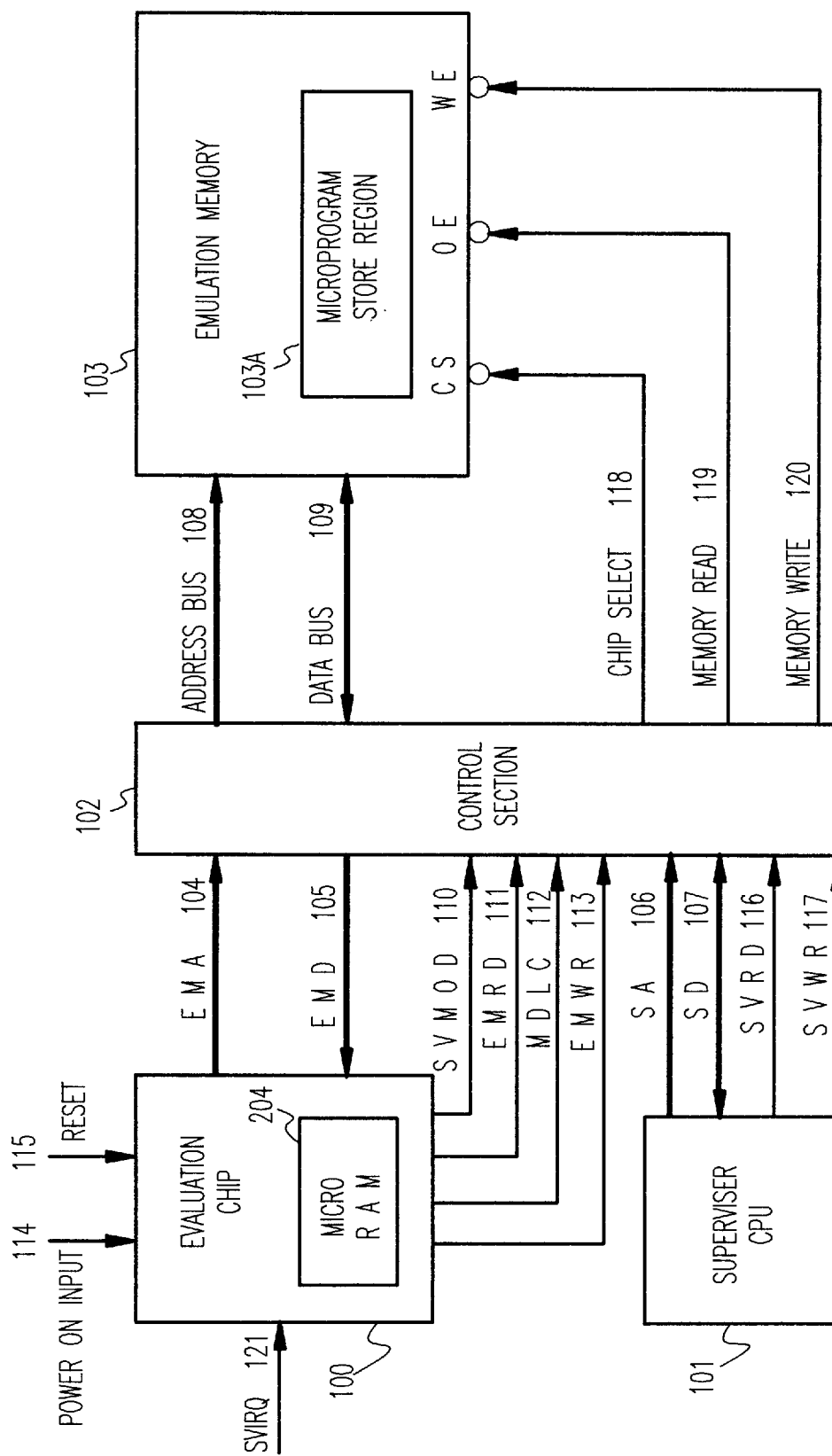
FIG. 1 is a block diagram illustrating the constitution of an emulation device as a preferred embodiment according to the present invention.

FIG. 1 is a block diagram illustrating the constitution of an emulation device according to the present invention. The evaluation chip, the supervisor CPU, the control section and the emulation memory are formed as one chip semiconductor devices, respectively.

Figure 5:
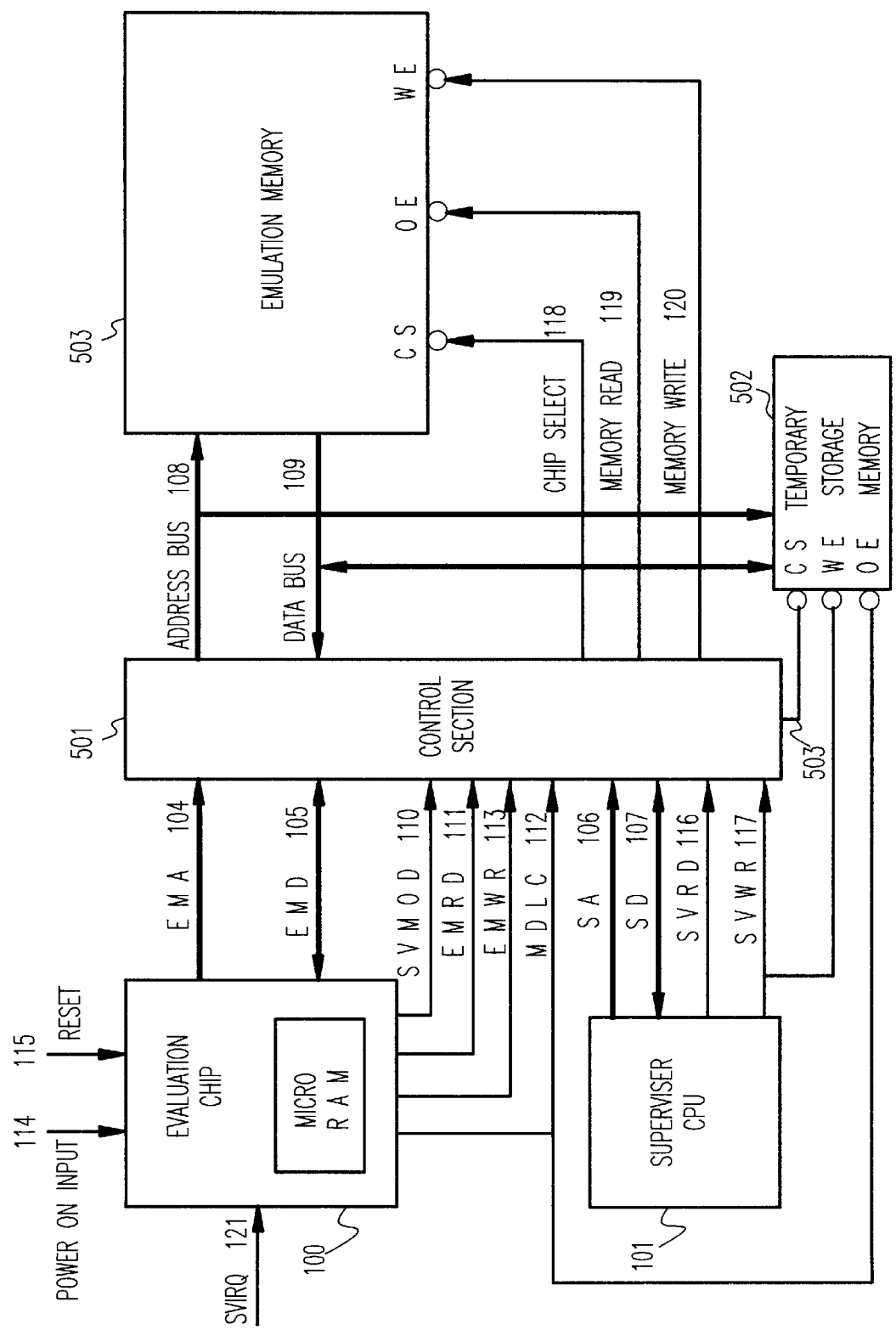
FIG. 5 is a block diagram illustrating the constitution of an emulation device of the prior art.
Figure 6:
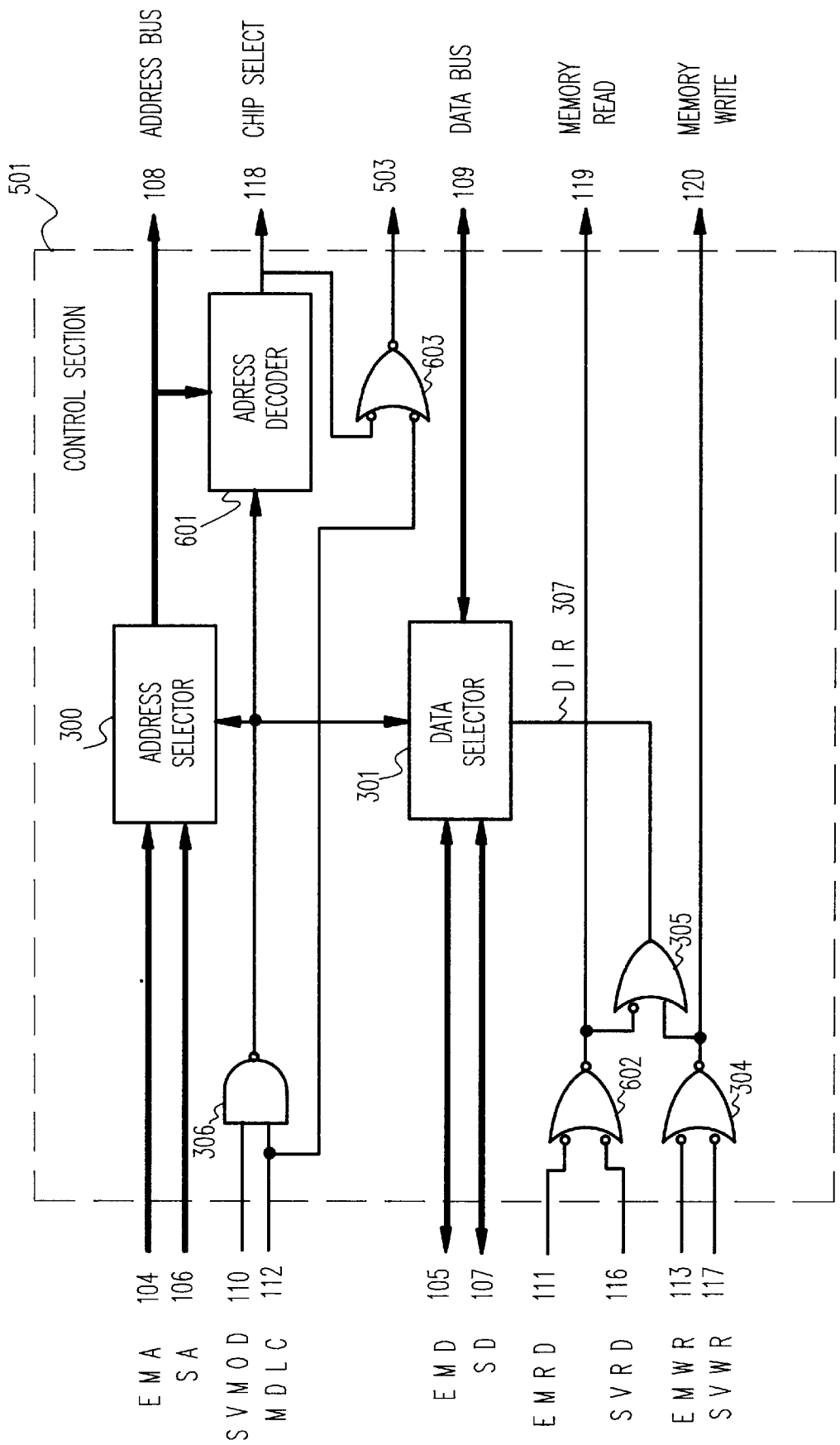
FIG. 6 is a block diagram of a control section shown in FIG. 5.

In the figure, components or elements having the same constitution and the function as those in the prior art shown in FIG. 5 and FIG. 6 carry the same reference numerals. In the figure, are shown only the constitution necessary for writing a microprogram from the outside of the emulation device to a RAM in an evaluation chip, and other peripheral circuits are not illustrated.

An external host machine (not illustrated) is connected to a supervisor CPU 101 and communication between the emulation device and the outside is conducted by the supervisor CPU.

An emulation memory 103 of this embodiment has two memory regions. The first one is provided for a memory region to store user's program and data required for an evaluation chip when the evaluation chip executes the instructions based on the user's program (hereinafter referred to as general data). The second one is provided for a microprogram storage region 103A for temporarily storing microprogram for operation control.

When a supervisor interrupt demand signal SVIRQ inputted from the outside of the emulation becomes active (privileged mode), the supervisor CPU 101 outputs the address and the data sent from the host machine to an address bus SA 106 and a data bus SD 107, respectively, and writes the user's program to the general data storage region or writes the microprogram for operation control to the temporary storage region 103A in the emulation memory 103.

The control section 102 has a function of controlling the evaluation chip 100 and the supervisor CPU 101 to access to the simulation memory 103, and the control is conducted by various control signals outputted from the evaluation chip 100 and the supervisor CPU 101.

The active level for each of the control signals is defined as: SVMOD 110="1", EMRD 111="0", MDLC 112="0", EMWR 113="0", power ON input 114="1", RESET 115= "0", SVRD 116="0", SVWR 117="0", chip select 118="0", memory read 119="0", memory write 120="0", SVIRQ 121="1", respectively. EMRD, EMWR, SVRD and SVWR are exclusive to each other and are not simultaneously at the active level.

Figure 2:
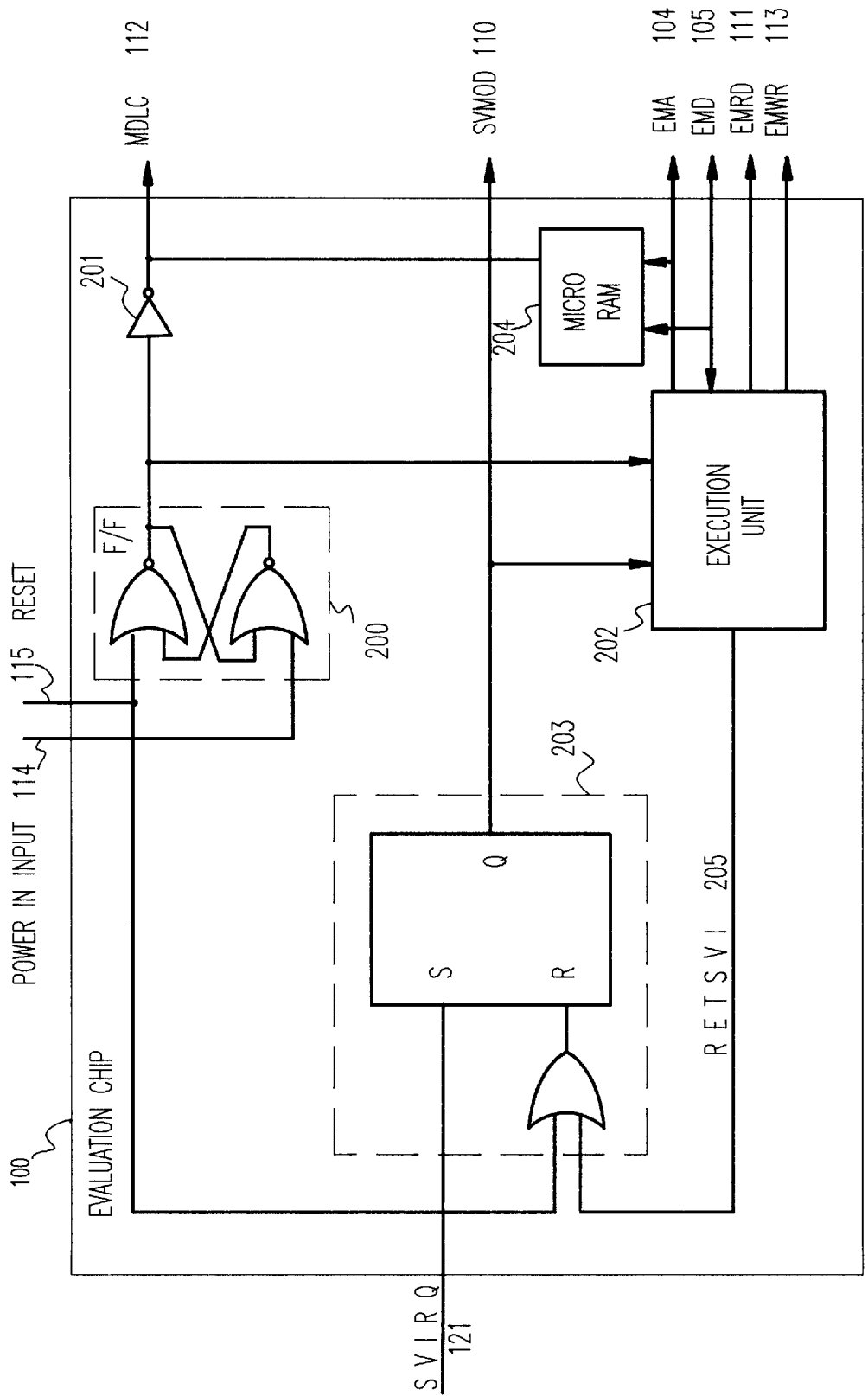
FIG. 2 is a block diagram of an evaluation chip shown in FIG. 1.

FIG. 2 is a block diagram illustrating the constitution of the evaluation chip 100 as one of constituent elements in this embodiment.

The evaluation chip 100 comprises a flip-flop 200, an invertor 201, an execution unit 202 and a supervisor flag 203.

The output from the flip-flop 200 is at "1" only when the power ON input 114 is "1" and RESET 115 is at "0", at which the output MDLC 112 of the invertor 201 is "0".

When the output from the flip-flop 200 is "1" and SVMOD 110 is at "1", the execution unit 202 outputs the address of the microprogram storage region 103A in the emulation memory 103 to the EMA 104, and inputs the data of the microprogram from the EMD 105 to the micro RAM 204.

On the other hand, when SVMOD 110 is "0", the execution unit 202 executes the instructions based on the user's program stored in the emulation memory 103. In this case, the execution unit 202 outputs an address to the EMA 104 for access to the emulation memory 103, inputs/outputs data at the EMD 105 and, further, outputs a read signal EMRD 111 or the write signal EMWR 118 as the access strobe.

When the execution unit 202 executes the instruction "RETSVI instruction" for returning from the supervisor mode in the user's program, it turns the RETSV 205 to "1" and output the same.

The supervisor flag 203 is set when the supervisor interrupt demand signal SVIRQ 121 from the outside is "1", and reset when the RESET 115 as a reset signal is "1", or the RETSVI 205 indicating the returning from the supervisor interruption is "1". The output signal of the supervisor flag 203 is outputted from the evaluation chip 100 as the signal SVMOD 110 indicating whether the step is in the supervisor mode or not. If SVMOD is "1", it indicates the supervisor mode.

Figure 3:
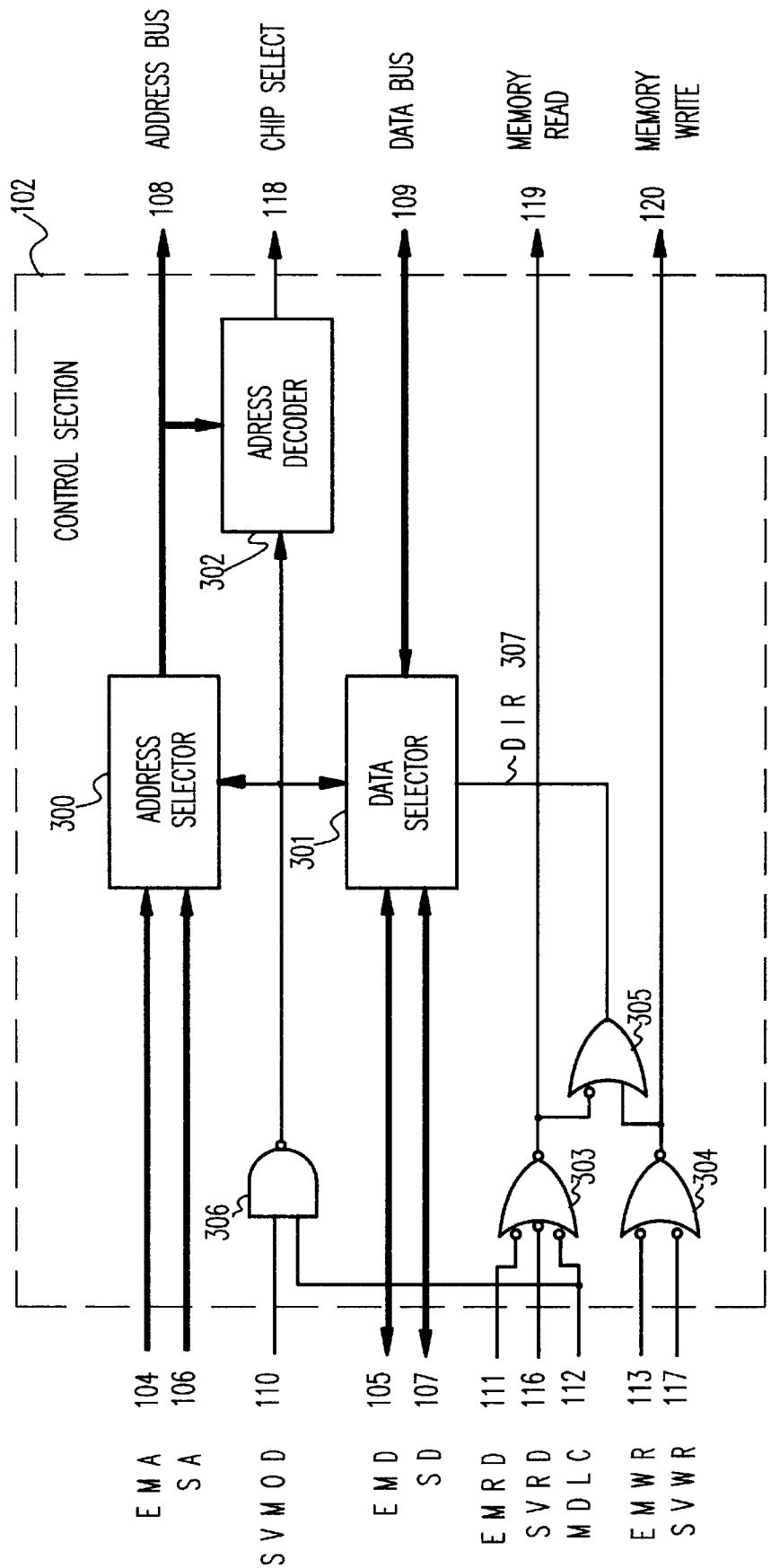
FIG. 3 is a block diagram illustrating the constitution of a control section in a preferred embodiment according to the present invention.

FIG. 3 is a block diagram illustrating the constitution of the control section 102 as one of the constituent elements of this embodiment.

As shown in the figure, the control section 102 comprises an address selector 300, a data selector 301, an address decoder 302, NOR-gates 303 and 304, an OR gate 305 and a NAND gate 306.

The address selector 300 outputs the value of the EMA 104 to the address bus 108 when SVMOD 110 is "0" or when the SVMOD 110 is "1" and the MDLC 112 is "0", that is, when the output of the NAND gate 306 is "1". Further, the address selector 300 outputs the value of the SA 106 to the address bus 108 when the SVMOD 110 is "1" and the MDLC 112 is "1", that is, when the output of the NAND gate 306 is "0".

The address decoder 302 inputs the output signal of the NAND gate 306 and the value of the address bus 108, and outputs the chip select 118. Assuming the address mapping of the memory region for the general data as address "0-FFFFh" and the address mapping of the microprogram storage region 103A as address "10000-1FFFFh" of the emulation memory 103 as viewed from the supervisor CPU 101, the address decoder is constituted such that the chip select 118 is "0" when the SVMOD 110 is "1" and the address value on the address bus is between 10000 and 1FFFFh.

The memory read 119, which is the output from the NOR gate 303, is at the active level "0" when one of the EMRD 111, SVRD 116 and MDLC 112 is at "0". Further, the memory write 120, which is the output of the NOR gate 304, is at the active level "0" when one of the EMWR 113 or SVWR 117 is at "0".

The data selector 301 outputs the value of the EMD 105 or SD 107 to the data bus 109 when the DIR 307 is at "0" and intakes the value of the data bus 109 to the EMD 105 or SD 107 when the DIR 307 is at "1". In the above explanation, EMD 105 is selected if the output signal from the NAND gate 306 is at "1", while the SD 107 is selected it is at "0" respectively.

Next, explanation is made for the operation of writing the microprogram inputted from the external host machine connected with the supervisor CPU 101 into the microprogram storage region 103A, and the operation of transferring the written microprogram from the region 103A to the micro RAM 204 in the evaluation chip 100.

Figure 4:
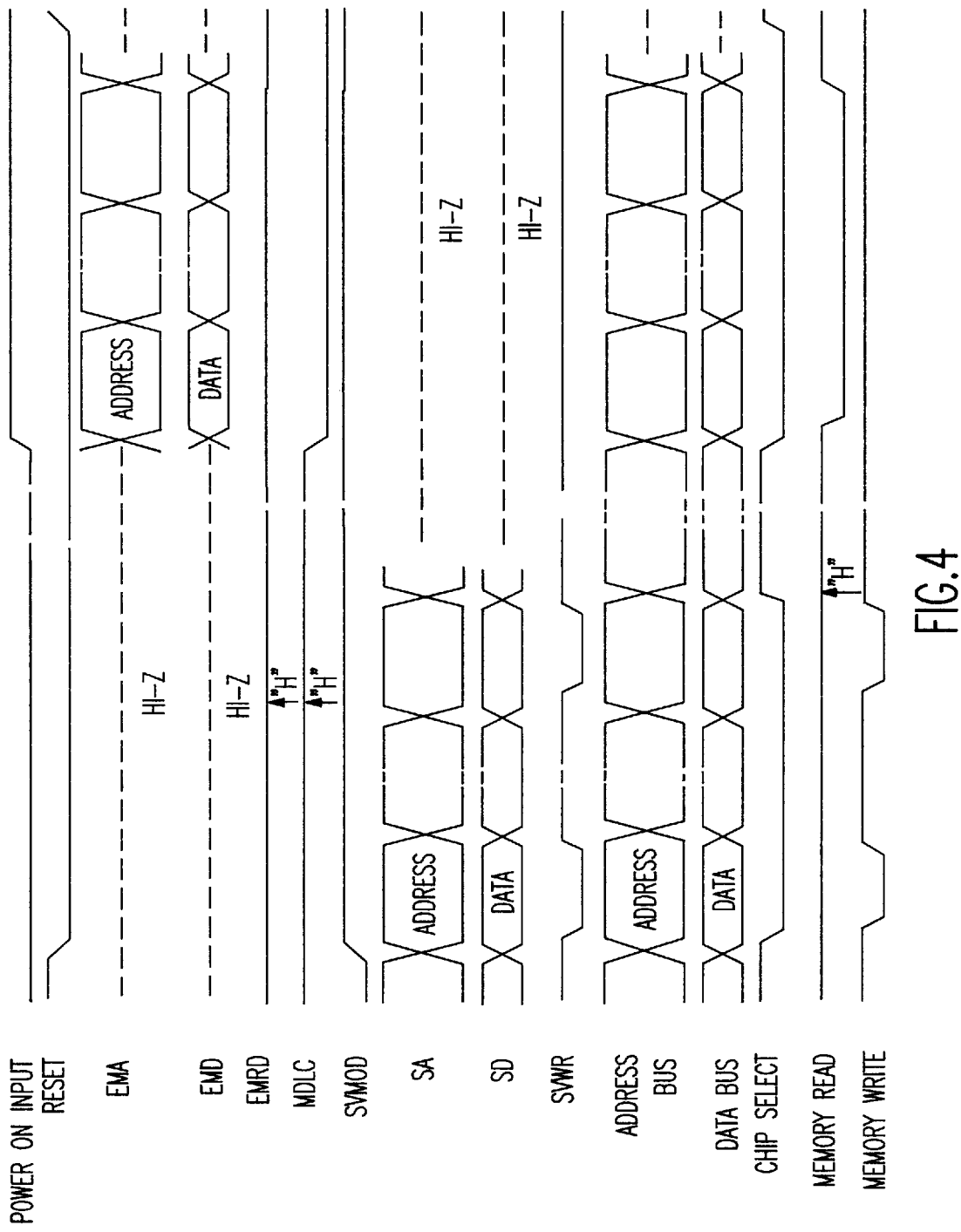
FIG. 4 is a timing chart illustrating the operation of the emulation device shown in FIG. 1.

FIG. 4 shows the operation sequence of the emulation device of the invention.

At first, the sequence that the supervisor CPU 101 stores the microprogram into the emulation memory 103 is to be explained.

At first, "1" is inputted to the RESET 115, "0" is inputted to the power ON input 114 and "0" is inputted to the SVIRQ 121 from the outside respectively. These signals reset the supervisor flag 203 to turn the output SVMOD 110 to "0", and the output of the flip-flop 200 in the evaluation chip 100 to "0", while the MDLC 112 to "1". Subsequently, the RESET 115 is turned to "0", while the SVIRQ 121 is turned to "1". The output from the F/F 200 remains unchanged to keep the MDLC 112 at "1", whereas the SVMOD 110 turns "1" since the supervisor flag 203 is set.

Since the SVMOD 110 is "1" and the MDLC 112 is "1", the output signal from the NAND gate 306 in the control section 102 is "0". If the output from the NAND gate 306 is "0", the address selector 300 connects the SA 106 to the address bus 108, while the data selector 301 connects the SD 107 to the data bus 109.

Subsequently, the supervisor CPU 101 starts processing for storing the microprogram to the microprogram storage region 103A. The sequence is as shown below.

1-1) The supervisor CPU 101 outputs the microprogram write start address "10000h" in the 103A to the SA 106 and the data of the microprogram sent from the outside to the SD 107 respectively.

1-2) Subsequently, the supervisor CPU turns only the SVWR 117 to "0". This turns the output of the OR gate 304 in the control section 102 to "0" and turns the memory write signal 120 to "0".

1-3) The output of the NAND gate 306 turns "0", the output DIR 307 of the OR gate 305 turns "0", the address selector 300 outputs the value of the SA 106 to the address bus 108, and the data selector 301 outputs the data of the SD 107 to the data bus 109.

1-4) Since the value of the address bus 108 is between 10000h and 1FFFFh and the output of the NAND gate 306 is "0", the address decoder 302 outputs the chip select 118 as "0".

1-5) Accordingly, the data of the microprogram are written into in microprogram storage region 103A according to the address on the address bus 108.

1-6) Subsequently, the supervisor CPU 101 increments the address on the SA by one and outputs the succeeding data sent from the external host machine to the SD 107.

All the microprogram are written into the region 103A by repeating the steps (1-1)–(1-5) described above until the microprogram write end address "1FFFFh" is outputted.

Next, the sequence of transferring the microprogram written in the region 103A to the micro RAM 204 in the evaluation chip 100 is explained.

At first, the power ON input 114 is set to "1" while keeping the RESET 115 at "0" and SVIRQ 120 at "1". Accordingly, the output from the flip-flop 200 in the chip 100 turns to "1", therefore, the MDLC 112 is at the active level "0".

Since SVMOD 110 is at "1" and the MDLC 112 is at "0", the output signal of the NAND gate 306 in the control section 102 turns to "1" while the output of the OR gate 303 turns to "0". In this case, the address selector 300 delivers the value of the EMA 104 outputted from the evaluation chip to the address bus 108, while the data selector 301 connects such that the data sent from the emulation memory 103 by way of the data bus 109 is outputted to the EMD 105.

Then, the evaluation chip 100 starts processing of reading the microprogram from the region 103A and storing it in the micro RAM 204 in the evaluation chip 100. The sequence is as shown below.

2-1). The evaluation chip 100 outputs the microprogram read start address "10000h" in the region 103A to the EMA 104.

2-2) Since the output of the NAND gate 306 is at "1" and the output of the OR gate 305 is at "0", the address selector 300 outputs the value of the EMA 104 to the address bus 108. Further, the data selector 301 outputs the data on the data bus 109 to the EMD 105.

2-3) Since the MDLC 112 is at "0" and then the memory read signal 119 is at "0", the data of the microprogram at the address of the address bus 108 is read out to the data bus 109 and the data of the data bus 109 is delivered to the EMD 105.

2-4) The data of the microprogram read to the EMD 105 is written into the micro RAM 204 according to the address on EMA 104.

2-5) The evaluation chip 100 increments the address of EMA by one and repeats the sequence from (2-1)–(2-3) till the microprogram write end address "1FFFFh" is outputted, thereby writing all the microprogram into the micro RAM 204 in the evaluation chip 104.

In the foregoing, explanations have been made only to the operation of storing the microprogram into the temporary storage region 103A or writing the microprogram stored in the region 103A into the micro RAM in the evaluation chip. When a user's program is written into the general data region, the operations are the same as described above excepting that the address is for the general data region. Further, if will be apparent that when the supervisor signal SVMOD is at "0", the evaluation chip executes an instruction based on the instruction of the user's program in the general data storage region of the emulation memory 103.

The present invention has been described above with reference to the preferred embodiment but the invention is not restricted only to such embodiment.

As has been described above according to the present invention, the microprogram written into the evaluation microcomputer can be stored with no physical addition of the constitution at all, to easily cope with alteration of the microprogram. Accordingly, the existent hardware sources can be utilized as they are and the number of steps for evaluation can be reduced economically.

Further, since the existent hardware resources are utilized as they are, increase of the pattern area on the substrate can be prevented.

Further, reduction of the size and remarkable reduction of the cost can be attained for the emulation device.

Further, if the circuits for the control section are constituted with gate arrays or PLD, since there is no requirement at all for increasing the hardware resources, it is more effective.

What is claimed is:

1. An emulator comprising:
   an evaluation microcomputer formed as a first single semiconductor chip, said evaluation microcomputer including therein a storage area,
   an emulation memory formed as a second semiconductor chip provided separately from and independently of said first single semiconductor chip, said emulation memory including therein a first memory area which temporarily stores a string of instructions for a program to be evaluated and a second memory area which temporarily stores a microprogram, and
   a control means for controlling a connection between the evaluation computer and the evaluation memory said control means including a first logic circuit for generating a read strobe signal to said temporary storage region based on first and second control signals inputted from the outside of said emulation device and a second logic circuit for generating a privileged mode signal indicating entrance to a privileged mode based on a third signal inputted from the outside of said emulation device, said evaluation microcomputer accessing said emulation memory to read said microprogram from said second memory area and write said microprogram into said storage area and thereafter accessing said emulation memory to read each of said instructions for said program to be evaluated and executes each of said instructions by use of said microprogram written into said storage area.

2. An emulation device comprising:
   an evaluation microcomputer having a rewritable microprogram storage means;
   an emulation memory as substituting the memory means for storing user's program;
   a microcomputer for supervising a communication between said emulation device and the outside thereof, said second microcomputer controlling a privileged mode upon receipt of an interrupt instruction from outside the emulation device; and
   a control means for controlling a connection of a plurality of buses among said evaluation microcomputer, said microcomputer and said emulation memory, said emulation memory provides a region for temporarily storing a microprogram inputted from the outside of said emulation device to control operation of said evaluation microcomputer.

3. An emulation device as defined in claim 2, wherein said evaluation microcomputer further comprises an execution means for executing an instruction described in a microprogram stored in said microprogram storage means, a strobe signal generation means for generating a strobe signal for writing said microprogram to said microprogram storage means when a reset signal inputted from the outside of said emulation device is at an active level and a supervise detection means for generating a supervise mode signal when an interruption demand is inputted from the outside of said emulation device to invoke said communication between said emulation device and the outside thereof.

4. An emulation device as defined in claim 3, wherein the control means comprises:
   a first selection means for connecting a address bus of said evaluation microcomputer with a address bus of said emulation memory when said strobe signal is active level and a address bus of said microcomputer with said address bus of said emulation memory when said supervise signal is active level; and
   a first selection means for connecting a data bus of said evaluation microcomputer with a data bus of said emulation memory when said strobe signal is active level and a data bus of said microcomputer with said data bus of said emulation memory when said supervise signal is active level.

5. An emulation device comprising:
a first one chip microcomputer including a first rewritable RAM for storing a microprogram, said first microcomputer executing an instruction supplied thereto in response to said microprogram;
a second rewritable one chip RAM for storing user's program;
a second one chip microcomputer for controlling a privileged mode such as interruption processing upon receipt of an interrupt instruction from the outside of said emulation device; and
an one chip control section for controlling communication among said first and second microcomputers and the second RAM based on various control signals outputted from said first and second microcomputers,
wherein said second RAM has a temporary storage region for temporarily storing said microprogram to be stored in said first RAM.

6. An emulation device as claimed in claim 5, wherein the first microcomputer further includes an execution unit for executing a microprogram instruction stored in the first RAM, a first logic circuit for generating a read strobe signal to said temporary storage region based on first and second control signals inputted from the outside of said emulation device and a second logic circuit for generating a privileged mode signal indicating entrance to the privileged mode based on a third signal inputted from the outside of said emulation device.

7. An emulation device as defined in claim 5, wherein the control section comprises a first selection means for outputting one of address data from said first microcomputer and from second microcomputer to said second RAM and a second selection means for connecting a data bus of the second RAM to one of a data bus of said first microcomputer and a data bus of said second microcomputer, said first selection means selects the address outputted from said second microcomputer when said privileged mode signal is active and said read strobe signal is non-active while selects the address outputted from said second microcomputer when said privileged mode signal is active, said second selection means selects the data bus of said first microcomputer when said privileged mode signal is non-active and selects the data bus of said second microcomputer when said privileged mode signal is active and said read strobe signal is non-active.

* * * * *